US012597225B2

(12) United States Patent
Cao et al.

(10) Patent No.: US 12,597,225 B2
(45) Date of Patent: Apr. 7, 2026

(54) IMAGE PROCESSING METHOD AND APPARATUS, ELECTRONIC DEVICE, PROGRAM, AND READABLE STORAGE MEDIUM

(71) Applicant: TENCENT TECHNOLOGY (SHENZHEN) COMPANY LIMITED, Shenzhen (CN)

(72) Inventors: Wensheng Cao, Shenzhen (CN); Wei Cao, Shenzhen (CN); Tangxi Chen, Shenzhen (CN); Lijun Yuan, Shenzhen (CN); Xiaojie Wang, Shenzhen (CN); Chong Zhang, Shenzhen (CN); Meng Zhai, Shenzhen (CN); Xingyuan Zhu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 435 days.

(21) Appl. No.: 18/299,157

(22) Filed: Apr. 12, 2023

(65) Prior Publication Data

US 2023/0252758 A1 Aug. 10, 2023

Related U.S. Application Data

(63) Continuation of application No. PCT/CN2022/094621, filed on May 24, 2022.

(30) Foreign Application Priority Data

Jun. 11, 2021 (CN) .......................... 202110655426.0

(51) Int. Cl.
*G06V 10/54* (2022.01)
*G06T 1/20* (2006.01)
(Continued)

(52) U.S. Cl.
CPC ................ *G06V 10/54* (2022.01); *G06T 1/20* (2013.01); *G06T 1/60* (2013.01); *H04N 19/186* (2014.11)

(58) Field of Classification Search
CPC .. G06T 1/20; G06T 1/60; G06V 10/54; H04N 19/186
See application file for complete search history.

(56) References Cited

U.S. PATENT DOCUMENTS 5,877,770 A * 3/1999 Hanaoka ................. G06T 15/04
345/566
10,467,803 B1 11/2019 Degtyarev et al.
(Continued)

FOREIGN PATENT DOCUMENTS

CN 102800122 A 11/2012
CN 106210883 A 12/2016
(Continued)

OTHER PUBLICATIONS

China National Intellectual Property Administration (CNIPA) Office Action 1 for 202110655426.0 Jul. 20, 2021 9 Pages (including translation).
(Continued)

*Primary Examiner* — Daniel F Hajnik
*Assistant Examiner* — Jed-Justin Imperial
(74) *Attorney, Agent, or Firm* — Anova Law Group, PLLC

(57) ABSTRACT

An image processing method includes: acquiring an image size of an image and original image data of the image; creating a first texture storage area according to the image size, and storing image data of the image into the first texture storage area; creating, according to the image size and a target encoding format, a second texture storage area for storing target image data to be generated, a color encoding
(Continued)

Acquire an image size of an image to be processed and original image data of the image to be processed, a color encoding format corresponding to the original image data of the image to be processed being a source encoding format — S201

Create a first texture storage area according to the image size, and store the original image data of the image to be processed into the first texture storage area — S202

Create, according to the image size and the target encoding format, a second texture storage area for storing target image data to be generated, a color encoding format corresponding to the target image data being the target encoding format — S203

Perform, through a shader called by a GPU, encoding format conversion on the original image data stored in the first texture storage area to generate the target image data corresponding to each texture coordinate in the second texture storage area, and store the target image data corresponding to the each texture coordinate into a corresponding storage location in the second texture storage area — S204 format corresponding to the target image data being the target encoding format; and performing, through a shader called by a graphics processor (GPU), encoding format conversion on the original image data stored in the first texture storage area to generate the target image data corresponding to each texture coordinate in the second texture storage area, and storing the target image data corresponding into the each texture coordinate to a corresponding storage location in the second texture storage area.

17 Claims, 7 Drawing Sheets

(51) Int. Cl.
    *G06T 1/60*       (2006.01)
    *H04N 19/186*    (2014.01)

(56)             References Cited

U.S. PATENT DOCUMENTS

| | | | | |
|---|---|---|---|---|
| 2004/0105653 A1* | 6/2004 | Horiuchi | ................. | H04N 5/76 |
| | | | | 386/226 |
| 2005/0180643 A1* | 8/2005 | Okada | ................. | H04N 19/423 |
| | | | | 375/E7.161 |

| | | | | |
|---|---|---|---|---|
| 2018/0310013 A1* | 10/2018 | Tanner | ................... | H04N 19/53 |
| 2019/0250773 A1* | 8/2019 | Miyaki | .............. | G06F 3/04815 |
| 2021/0134024 A1* | 5/2021 | Chakrabarty | .......... | G06T 11/40 |

FOREIGN PATENT DOCUMENTS

| | | |
|---|---|---|
| CN | 108154539 A | 6/2018 |
| CN | 110177287 A | 8/2019 |
| CN | 111093096 A | 5/2020 |
| CN | 113096233 A | 7/2021 |

OTHER PUBLICATIONS

The World Intellectual Property Organization (WIPO) International Search Report for PCT/CN2022/094621 Jul. 27, 2022 13 Pages (including translation).

Unity-Technologies /com.unity.webrtc. URL:https://github.com/Unity-Technologies/com.unity.webrtc/blob/release/2.4.0-exp.3/Plugin~/WebRTCPlugin/Codec/SoftwareCodec/SoftwareEncoder.cpp.

* cited by examiner

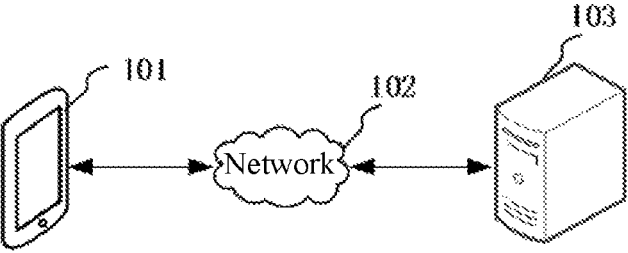

FIG. 1

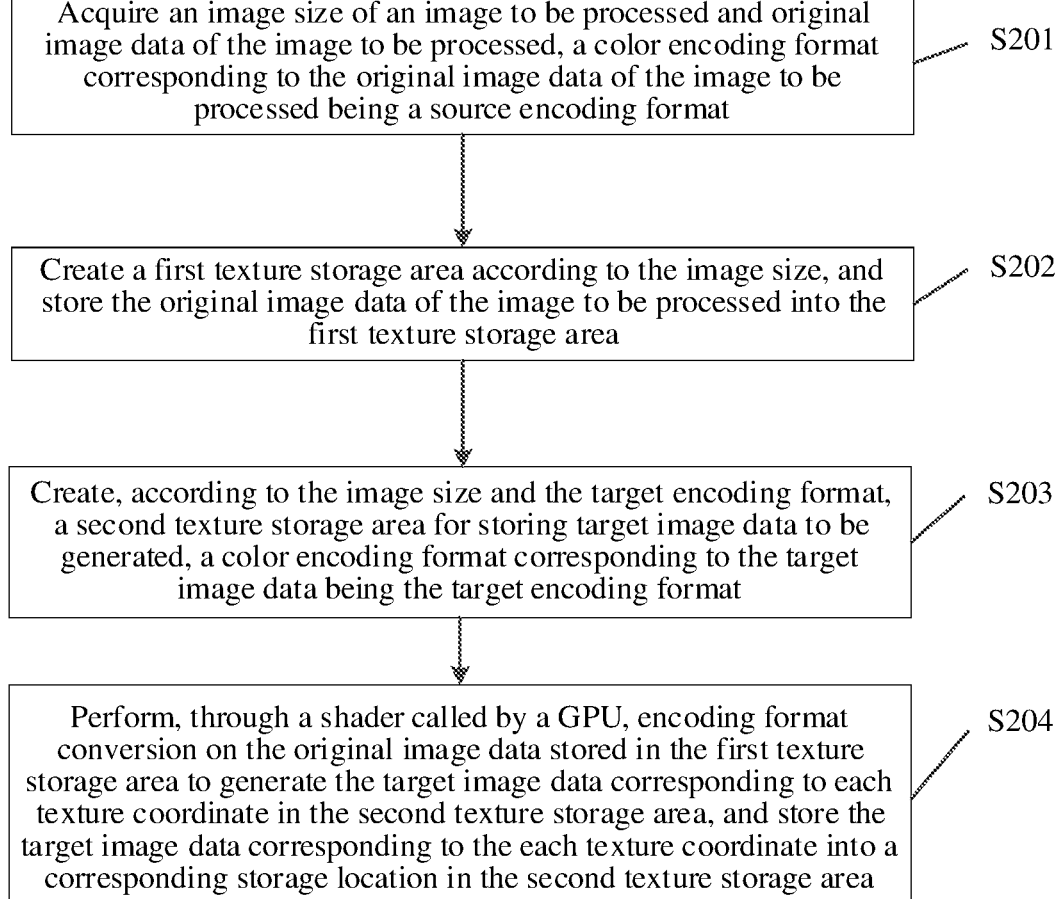

| | |
|---|---|
| Acquire an image size of an image to be processed and original image data of the image to be processed, a color encoding format corresponding to the original image data of the image to be processed being a source encoding format | S201 |
| Create a first texture storage area according to the image size, and store the original image data of the image to be processed into the first texture storage area | S202 |
| Create, according to the image size and the target encoding format, a second texture storage area for storing target image data to be generated, a color encoding format corresponding to the target image data being the target encoding format | S203 |
| Perform, through a shader called by a GPU, encoding format conversion on the original image data stored in the first texture storage area to generate the target image data corresponding to each texture coordinate in the second texture storage area, and store the target image data corresponding to the each texture coordinate into a corresponding storage location in the second texture storage area | S204 |

FIG. 2

Y area

U area     V area

IMAGE PROCESSING METHOD AND APPARATUS, ELECTRONIC DEVICE, PROGRAM, AND READABLE STORAGE MEDIUM

CROSS-REFERENCES TO RELATED APPLICATIONS

This application is a continuation application of PCT Patent Application No. PCT/CN2022/094621, entitled "IMAGE PROCESSING METHOD AND APPARATUS, AND ELECTRONIC DEVICE, PROGRAM AND READABLE STORAGE MEDIUM" and filed on May 24, 2022, which claims priority to Chinese Patent Application No. 202110655426.0, filed with the China National Intellectual Property Administration on Jun. 11, 2021 and entitled "IMAGE PROCESSING METHOD AND APPARATUS, ELECTRONIC DEVICE, AND READABLE STORAGE MEDIUM", the entire contents of both of which are incorporated herein by reference.

FIELD OF THE TECHNOLOGY

The present disclosure relates to the fields of image processing, gaming, cloud technologies, block chains, and the like, and in particular, to an image processing method and apparatus, an electronic device, a program, and a readable storage medium.

BACKGROUND OF THE DISCLOSURE

At present, with the development of image processing technologies, a variety of color spaces have emerged to represent image colors, for example, a red-green-blue (RGB) color space and a luminance-chrominance (YUV) color space.

In many practical application scenes, it is often necessary to convert an image encoded in one color space into an image encoded in another color space. In a related technology, when conversion of image data in different color encoding formats is performed, a manner of traversing all pixel points in an image in a source encoding format one by one is usually used to calculate pixel values in another encoding format one by one. Although the conversion can be completed by using current manners, there is a problem of low conversion efficiency.

SUMMARY

Embodiments of the present disclosure provide an image processing method and apparatus, an electronic device, a program, and a readable storage medium, which improve the efficiency of converting image data in a source encoding format into target image data in a target encoding format.

In an aspect, an embodiment of the present disclosure provides an image processing method, performed in an electronic device, including: acquiring an image size of an image and original image data of the image, a color encoding format corresponding to the original image data being a source encoding format; creating a first texture storage area according to the image size, and storing image data of the image in the first texture storage area; creating, according to the image size and a target encoding format, a second texture storage area for storing target image data to be generated, a color encoding format corresponding to the target image data being the target encoding format; and performing, through a shader called by a graphics processor (GPU), encoding format conversion on the original image data stored in the first texture storage area to generate the target image data corresponding to each texture coordinate in the second texture storage area, and storing the target image data corresponding to the each texture coordinate to a corresponding storage location in the second texture storage area.

In an aspect, an embodiment of the present disclosure provides an image processing apparatus, including: a source data acquisition module, configured to acquire an image size of an image and original image data of the image, a color encoding format corresponding to the original image data being a source encoding format; a first texture processing module, configured to create a first texture storage area according to the image size and store image data of the image into the first texture storage area; a second texture processing module, configured to create, according to the image size and a target encoding format, a second texture storage area for storing target image data to be generated, a color encoding format corresponding to the target image data being the target encoding format; and a target data acquisition module, configured to perform, through a shader called by a GPU, encoding format conversion on the original image data stored in the first texture storage area to generate the target image data corresponding to each texture coordinate in the second texture storage area, and store the target image data corresponding to the each texture coordinate into a corresponding storage location in the second texture storage area.

In an aspect, an embodiment of the present disclosure provides an electronic device. The electronic device includes a processor and a memory. The processor and the memory are interconnected. The memory is configured to store a computer program. The processor is configured to perform a method provided by any example embodiment of the image processing method when calling the computer program.

In an aspect, an embodiment of the present disclosure provides a non-transitory computer-readable storage medium. The computer-readable storage medium stores a computer program. The computer program is executed by a processor to implement the method provided by any example embodiment of the image processing method.

BRIEF DESCRIPTION OF THE DRAWINGS

In order to describe technical solutions in embodiments of the present disclosure more clearly, the drawings required to be used in descriptions about the embodiments will be simply introduced below. Apparently, the drawings in the following descriptions are only some embodiments of the present disclosure. Those of ordinary skill in the art may further obtain other drawings according to these drawings without creative work.

FIG. 1 is a schematic structural diagram of an image processing system in an application scene provided by an embodiment of the present disclosure.

FIG. 2 is a schematic flowchart of an image processing method provided by an embodiment of the present disclosure.

DESCRIPTION OF EMBODIMENTS

Figures 3, 4:
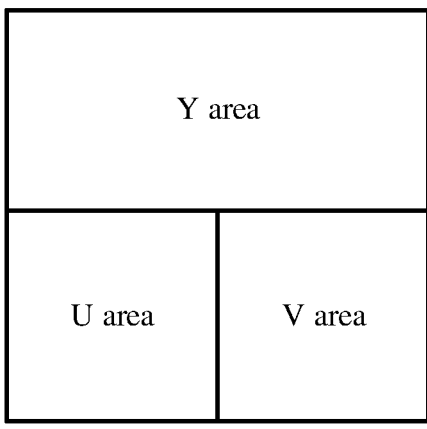
FIG. 3 is a schematic layout of a second texture storage area provided by an embodiment of the present disclosure.
FIG. 4 is a schematic diagram of storing target image data provided by an embodiment of the present disclosure.

The technical solutions in embodiments of the present disclosure are clearly and completely described in the following with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts fall within the protection scope of the present disclosure.

The image processing method provided by the embodiments of the present disclosure relates to various fields of a cloud technology, such as cloud computing, cloud services, and cloud gaming, in the cloud technology.

The cloud technology refers to a collocation technology which collocates series of resources such as hardware, software, and networks in a wide area network or a local area network to realize computing, storage, processing, and sharing of data. The image processing method provided by an embodiment of the present disclosure may be implemented based on the cloud computing in the cloud technology.

The cloud computing refers to obtaining required resources in an on-demand and scalable manner through a network, and is a product of the development and integration of computer and network technologies, such as grid computing, distributed computing, parallel computing, utility computing, network storage technologies, virtualization, and load balance.

The cloud gaming, also referred to as gaming on demand, is an online gaming technology based on a cloud computing technology. A cloud gaming technology enables a thin client that has relatively limited graphics processing and data computing capabilities to run high quality games. In a cloud gaming scene, game logic does not run in a player game terminal, but in a cloud server. The cloud server renders a gaming scene into a video and audio stream and transmits the video and audio stream to the player game terminal through a network. The player game terminal does not need to have powerful graphic computing and data processing capabilities, but only needs to have a basic streaming media playback capability and a capability of acquiring instructions input by a player and transmitting the instructions to the cloud server.

For example, a user terminal and a server (such as a cloud gaming server) involved in the image processing method or apparatus disclosed by the present disclosure may form a block chain. The user terminal and the server (such as the cloud gaming server) are nodes on the block chain. Data involved in the image processing method or apparatus in the embodiments of the present disclosure, such as image data of an image to be processed and target image data, may be stored on the block chain.

The applicable scenes of the image processing method in the embodiments of the present disclosure are not limited. In practical applications, the embodiments of the present disclosure may be applied to various scenes in which an image encoded in one color space needs to be converted into an image encoded in another color space, including, but not limited to, a game-type application scene, for example, a scene in which an image encoded in an RGB color space is converted into an image encoded in a YUV color space and the like in a gaming scene.

The embodiments of the present disclosure does not make any limitation on a specific application scene of the image to be processed in the embodiments of the present disclosure, for example, the image to be processed may be the image to be processed in the game-type application scene. The embodiments of the present disclosure does not make a limitation on a specific application of the game-type application. The game-type application may be the cloud gaming, or may be a game requiring an installation of a client. A user can experience a network game through the client on a user terminal. The client may be a web client, an applet client, or a game client of the game-type application. No limits are made thereto in the embodiments of the present disclosure.

As an example, FIG. 1 is a schematic structural diagram of an image processing system applied to an application scene to which the embodiments of the present disclosure is applicable. It may be understood that the image processing method provided by the embodiments of the present disclosure may be applied to, but not limited to, the application scene shown in FIG. 1. In this example, description is provided by taking an image to be processed being each image of at least one virtual scene image in a cloud gaming scene as an example.

The image processing system in the embodiments of the present disclosure may include a user terminal and a server. As shown in FIG. 1, the image processing system in this example may include, but is not limited to, a user terminal 101, a network 102, and a server 103. The user terminal 101 (for example, a smartphone of a user) may communicate with the server 103 through the network 102. The server 103 is configured to convert image data of the image to be processed in a source encoding format into target image data in a target encoding format.

An image processing method in an example embodiment of the present disclosure is described below in combination with the application scene. An implementation process of the method may include the following steps:

Step S11. Acquire an image size of an image to be processed and original image data of the image to be processed. A color encoding format corresponding to the original image data of the image to be processed is a source encoding format.

Step S12. Create a first texture storage area according to the image size, and store image data of the image to be processed into the first texture storage area.

Step S13. Create, according to the image size and a target encoding format, a second texture storage area for storing the target image data to be generated. The encoding format corresponding to the target image data is the target encoding format.

Step S14. Perform, through a shader called by a GPU and in a parallel computing manner, encoding format conversion on the original image data stored in the first texture storage area to generate the target image data corresponding to each texture coordinate in the second texture storage area, and store the target image data corresponding to the each texture coordinate into a corresponding storage location in the second texture storage area.

In other words, in step S14, the image data of the image to be processed stored in the first texture storage area is taken as a sampling source, the second texture storage area is taken as a target to be rendered, resampling (namely, encoding format conversion) is performed on the image data of each coordinate location in the first texture storage area in parallel through the shader called by the GPU to generate the target image data corresponding to the each texture coordinate in the second texture, and the target image data corresponding to each texture coordinate is stored into a corresponding storage location in the second texture storage area.

Step S15. Read the target image data from the second texture storage area corresponding to at least one virtual scene image; perform image encoding processing on the read target image data to obtain a video stream; and transmit the video stream to the user terminal 101 through the network 102.

Step S16. The user terminal 101 receives the video stream transmitted by the server 103, and plays the video stream in the user terminal 101.

An execution subject of the foregoing step S11 to step S14 is the server 103. It can be understood that step S14 may be performed by a GPU of the server 103. In some embodiments, steps S11-S13 may be performed by a central processing unit (CPU) of the server 103, the GPU of the server 103, or a combination thereof.

It is to be understood that the foregoing is only an example, and the embodiments of the present disclosure does not make any limitation here.

The server may be an independent physical server, may also be a server cluster or a distributed system composed of a plurality of physical servers, or may also be a cloud server or a server cluster providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The network may include, but is not limited to: a wired network and a wireless network. The wired network includes: a local area network, a metropolitan area network, and a wide area network. The wireless network includes: Bluetooth, Wi-Fi, and other networks that implement wireless communication. The user terminal may be a smart phone (for example, an Android mobile phone and an iOS mobile phone), a tablet computer, a notebook computer, a digital broadcast receiver, a mobile Internet device (MID), a personal digital assistant (PDA), a desktop computer, a vehicle-mounted terminal (for example, a vehicle-mounted navigation terminal), a smart speaker, a smart watch, and the like. The user terminal and the server may be directly or indirectly connected in a wired or wireless communication manner, but are not limited thereto. The user terminal may also be determined based on actual application scene requirements, and no limits are made thereto herein.

Reference is made to FIG. 2, which is a schematic flowchart of an image processing method provided by an embodiment of the present disclosure. The method may be performed in an electronic device. The electronic device, for example, is a user terminal or a server, or may be a system or a block chain including the user terminal and the server. In one embodiment, the electronic device is a server. As shown in FIG. 2, the image processing method provided by the embodiments of the present disclosure includes the following steps:

Step S201. Acquire an image size of an image to be processed and original image data of the image to be processed. A color encoding format corresponding to the original image data of the image to be processed is a source encoding format.

Step S202. Create a first texture storage area according to the image size, and store the original image data of the image to be processed into the first texture storage area.

Step S203. Create, according to the image size and a target encoding format, a second texture storage area for storing target image data to be generated. A color encoding format corresponding to the target image data is the target encoding format.

Step S204. Perform, through a shader called by a GPU, encoding format conversion on the original image data stored in the first texture storage area to generate the target image data corresponding to each texture coordinate in the second texture storage area, and store the target image data corresponding to the each texture coordinate into a corresponding storage location in the second texture storage area. In other words, the original image data of the image to be processed stored in the first texture storage area is taken as a sampling source (that is, data subjected to encoding format conversion), the second texture storage area is taken as a target to be rendered, the target image data corresponding to each texture coordinate is computed through the shader called by the GPU, and the target image data corresponding to each texture coordinate is stored into a corresponding storage location in the second texture storage area.

It can be understood that step S204 may be performed by a GPU of the electronic device. In some embodiments, steps S201-S203 may be performed by one or more central processing unit (CPU) of the electronic device, the GPU of the electronic device, or a combination thereof.

In one embodiment, the image to be processed may be an image acquired in various scenes, and the embodiments of the present disclosure does not make any limitation herein. For example, the image to be processed may be an image acquired by a game engine calling a virtual camera in a gaming scene. The image size of the image to be processed may be set as required, and the embodiments of the present disclosure does not make any limitation herein. For example, the image size of the image to be processed may be Width*Height. Width represents a width, and Height represents a height. The color encoding format corresponding to the image data of the image to be processed is a source encoding format. The embodiments of the present disclosure does not limit a specific format of the source encoding format, which may be encoding formats corresponding to various forms of color spaces. For example, the source encoding format may be an RGB encoding format.

A data structure in a texture storage area (that is, the first texture storage area and the second texture storage area) may be, for example, a two-dimensional array. The elements stored in the texture storage area are some color values. Taking the first texture storage area as an example, the elements of a first texture are color values of various pixel points of the image to be processed. Individual color values are referred to as texture elements or texels. Each texel has a unique address in a texture. This address may be considered as values of a column and a row, which are respectively represented by U and V.

The texture coordinate is commonly referred to as a UV coordinate (a mapping coordinate), which may be understood as a percentage coordinate of the image. A coordinate in a horizontal direction is referred to as a U coordinate, and a coordinate in a vertical direction is referred to as a V coordinate. The coordinate value ranges of the UV coordinate in the horizontal direction and the vertical direction are both [0, 1]. The texture coordinate is independent of a texture size, is independent of a texture aspect ratio, and is a relative coordinate. When a texture image is applied to a primitive, a texture coordinate needs to be specified for each vertex of the primitive to indicate a location of the vertex in the texture image, so that a mapping relationship between the primitive and the texture image is established. In the embodiments of the present disclosure, the texture image is the image to be processed, and the texture coordinate corresponds to image coordinate in the image to be processed. For example, the width and the height of the image to be processed are respectively W and H. A lower left corner of the image is taken as an origin of the image, then the texture coordinate (0, 0) corresponds to the origin of the image, and the texture coordinate (0.5, 0.5) corresponds to a pixel point coordinate (0.5 W, 0.5 H) of the image to be processed, accordingly. That is, each texture coordinate in the embodiments of the present disclosure refers to the texture coordinate corresponding to a coordinate of a pixel point of a pixel value to be acted on any primitive in the image when the image to be processed is taken as the texture image, for example, the pixel value of the pixel point coordinate (0.5 W, 0.5 H) needs to be acted on one primitive, and the texture coordinate corresponding to the pixel point coordinate (0.5 W, 0.5 H) is (0.5, 0.5).

After the image to be processed is acquired, a first texture storage area (which may also be referred to as an RGB texture storage area) with the same size as the image is created according to the image size of the image to be processed, that is, the size of the first texture storage area is Width*Height, the first texture storage area is used for storing original image data of the image to be processed, and the original image data of the image to be processed may be written into the first texture storage area, that is, the image data of the image to be processed is stored into the first texture storage area.

Then, a second texture storage area is created according to the image size of the image to be processed and the target encoding format. When the target encoding format is a YUV encoding format, the width of the size of the second texture storage area may be the same as the width of the image size, and the height of the size of the second texture storage area may be 1.5 times the height of the image size. For example, the size of the second texture storage area is Width*1.5 Height. The second texture storage area is used for storing the target image data to be generated. The encoding format of the target image data is the target encoding format. The embodiments of the present disclosure does not limit the target encoding format. For example, the target encoding format may be the YUV encoding format.

In an embodiment, the step of performing, by the shader called by the GPU, encoding format conversion on the original image data stored in the first texture storage area to generate the target image data corresponding to each texture coordinate in the second texture storage area includes:

performing, through the shader called by the GPU and in a parallel computing manner, encoding format conversion on the original image data stored in the first texture storage area to obtain the target image data corresponding to each texture coordinate.

After the first texture storage area and the second texture storage area are created, the original image data of the image to be processed stored in the first texture storage area is taken as a sampling source. The sampling source means that the image data of the image to be processed is taken as image data to be subjected to image format conversion, and the second texture storage area is taken as a target to be rendered. The target image data of each texture coordinate corresponding to the target encoding format is obtained by the GPU calling the shader and in a parallel computing manner, and the target image data is stored into a corresponding storage location in the second texture storage area.

The shader refers to code or a module that is written in Shader languages such as computer graphics (CG) and high level shader language (HLSL), and is used for describing an object rendering manner in a game engine. Most mainstream game engines support a shader function. The CG is a general term for all graphics drawn by computer software, and is formed with a series of related industries for performing visual design and production by taking computers as main tools. The main function of the HLSL is to complete some complex image processing on a display card quickly and efficiently. The shader is applied in the field of computer graphics and refers to a set of instructions for a computer graphics resource to use when performing rendering tasks for computing the color or shading of an image.

By the embodiments of the present disclosure, for an image to be processed that needs to be subjected to encoding format conversion, a first texture storage area for storing original image data of the image to be processed is created according to an image size of the image to be processed, and a second texture storage area for storing target image data is created according to the image size and a target encoding format. When performing encoding format conversion, the original image data of the image to be processed stored in the first texture storage area is taken as a sampling source, the second texture storage area is taken as a target to be rendered, the target image data corresponding to each texture coordinate is computed through parallel computing through the shader called by the GPU, and the target image data corresponding to each texture coordinate is stored into a corresponding storage location in the second texture storage area. By using the above-mentioned technical solution, when the original image data of the image to be processed in the source encoding format is converted into the target image data in the target encoding format, the original image data is stored by creating a texture, so that parallel processing may be performed on the original image data to be converted by the GPU calling the shader, which avoids a manner of computing pixel by pixel, can complete encoding format conversion of the image quickly, and improves the processing efficiency of converting the image data of the image to be processed in the source encoding format into the target image data in the target encoding format.

To facilitate a more intuitive understanding of the second texture storage area, a detailed description is provided below in combination with an example.

In one embodiment, the source encoding format is an RGB encoding format, the target encoding format is a YUV encoding format, and the second texture storage area includes a first storage area for storing a luminance component of the YUV encoding format and a second storage area for storing a chrominance component. The first storage area and the second storage area are continuous, and each luminance component stored in the first storage area corresponds to one first chrominance component and one second chrominance component stored in the second storage area. The target image data of the first chrominance component and the target image data of the second chrominance component are successively stored in the second storage area.

In one embodiment, the source encoding format may be the RGB encoding format. In the RGB encoding format, each pixel of the image is composed of three components, red, green, and blue. The target encoding format may be the YUV encoding format, which can perform lossy compression on the image in the RGB encoding format, reduce occupied space, and can be used in a video encoding process. The second texture storage area includes a first storage area and a second storage area. As shown in FIG. 3, the first storage area is a storage area for a luminance component (that is, a Y component) of the YUV encoding format, that is, a Y area shown in FIG. 3, and the second storage area is a storage area for a chrominance component (that is, a U component and a V component) of the YUV encoding format, that is, a U area and a V area shown in FIG. 3.

When an encoding format is converted by using the shader, it is necessary to ensure that a first storage area and a second storage area are continuous. Target image data of a first chrominance component (that is, the U component) and target image data of a second chrominance component (that is, the V component) are continuously stored in the second storage area. In other words, the Y area, the U area, and the V area are continuous when storing data.

As shown in FIG. 4, assuming that the target image data stored in a second texture is stored in a manner shown in FIG. 4, it can be seen that the Y area is configured to store color values of a color component Y, that is, Y1 to Y24, the U area is configured to store color values of a color component U, that is, U1 to U6, and the V area is configured to store color values of a color component V, that is, V1 to V6. Every four Y components share a group of UV components. Y1, Y2, Y7, and Y8 share U1 and V1, Y3, Y4, Y9 and Y10 share U2 and V2, Y5, Y6, Y11, and Y12 share U3 and V3, Y13, Y14, Y19, and Y20 share U4 and V4, Y15, Y16, Y21, and Y22 share U5 and V5, and Y17, Y18, Y23, and Y24 share U6 and V6.

By the embodiments of the present disclosure, this storage manner of continuously storing the target image data of the first chrominance component and the target image data of the second chrominance component in the second storage area can be adapted to a working manner of the shader to a great extent, and the adaptability is improved.

In an embodiment, a size of the first storage area is the same as the image size, and the second storage area includes a first sub-area corresponding to the first chrominance component and a second sub-area corresponding to the second chrominance component. The first sub-area and the second sub-area have a same size. The first storage area, the first sub-area, and the second sub-area have the same aspect ratio, and widths of the first sub-area and the second sub-area are determined by the target encoding format.

In one embodiment, the embodiments of the present disclosure does not limit the size of the first storage area and the size of the second storage area of the second texture. In an example, the layout of the second texture is shown in FIG. 3, the first storage area is the Y area shown in the figure, the Y area is configured to store a color value corresponding to the luminance component (that is, the Y component), and the size of the first storage area may be the same as the image size of the image to be processed. The second storage area includes a first sub-area and a second sub-area. The first sub-area is the U area shown in the figure, the second sub-area is the V area shown in the figure, the U area is used for storing a color value corresponding to the first chrominance component (that is, the U component), and the V area is used for storing a color value corresponding to the second chrominance component (that is, the V component). The U area and the V area have the same size. In practical applications, it is necessary to ensure that the aspect ratios of the first storage area, the first sub-area, and the second sub-area are the same, that is, it is necessary to ensure that the aspect ratios of the Y area, the U area, and the V area are the same. In one embodiment, the width of the first sub-area and the width of the second sub-area are both ½ of the width of the first storage area. That is, the width of the U area and the width of the V area are both ½ of the width of the Y area.

By the embodiments of the present disclosure, the first storage area and the second storage area are arranged in the above-mentioned manner, which can be adapted to the working manner of the shader to a great extent, and improves the adaptability.

In one embodiment, the step of performing, through the shader called by the GPU, encoding format conversion on the original image data stored in the first texture storage area to generate the target image data corresponding to each texture coordinate in the second texture storage area, and storing the target image data corresponding to the each texture coordinate into the corresponding storage location in the second texture storage area includes:

determining, through the shader called by the GPU, a first storage location corresponding to the texture coordinate in the second texture storage area for any texture coordinate of the second texture storage area;

determining, according to a storage location correspondence between the first texture storage area and the second texture storage area, a second storage location corresponding to the texture coordinate in the first texture storage area; and computing, according to the original image data corresponding to the second storage location, the target image data corresponding to the texture coordinate, and storing the target image data into the first storage location.

In other words, the target image data corresponding to the texture coordinate is obtained by the GPU calling the shader to perform the following operations:

determining the first storage location corresponding to the texture coordinate in the second texture for any texture coordinate;

determining a second storage location corresponding to the texture coordinate in the first texture according to a storage location correspondence between the first texture storage area and the second texture storage area; and computing, according to the original image data of the image to be processed corresponding to the second storage location, the target image data corresponding to the texture coordinate, and storing the target image data into the first storage location.

In one embodiment, encoding format conversion may be performed on the original image data stored in the first texture storage area through the shader called by the GPU and in a parallel computing manner so as to obtain the target image data corresponding to each texture coordinate. In other words, the original image data of the image to be processed stored in the first texture storage area is taken as a sampling source, the second texture storage area is taken as a target to be rendered, the target image data corresponding to each texture coordinate may be determined at one time by the GPU calling the shader and in a parallel computing manner. For ease of description, a description is provided below by taking any texture coordinate as an example.

The first storage location corresponding to the texture coordinate in the second storage area is determined for any texture coordinate by the shader called by the GPU, and then the second storage location corresponding to the texture coordinate in the first texture storage area according to the storage location correspondence. In other words, the first storage location where a current texture coordinate is located in the second texture storage area is determined, and then the second storage location corresponding to the first storage location is determined in the first texture storage area. Finally, the target image data corresponding to the texture coordinate is computed according to the original image data of the image to be processed corresponding to the second storage location, and the target image data is stored into the first storage location.

Figure 5:
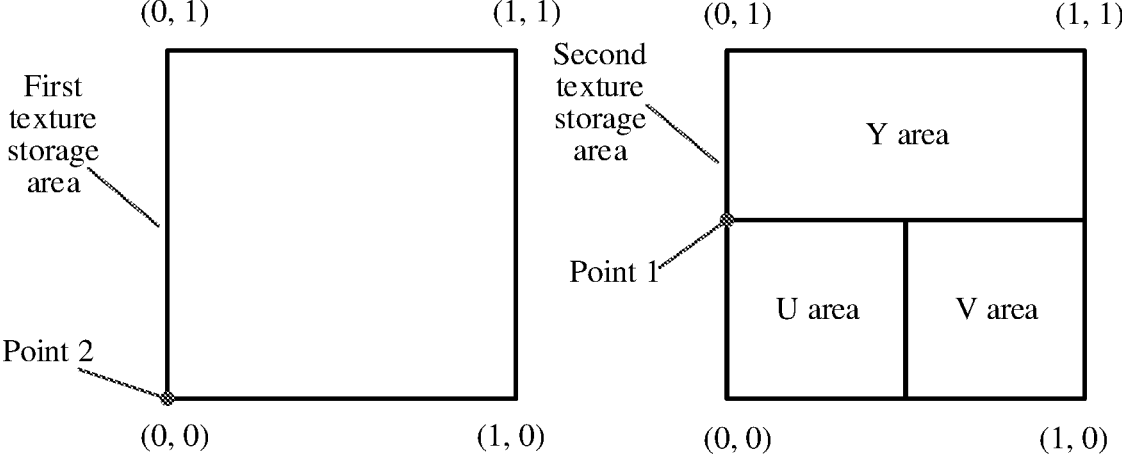
FIG. 5 is a schematic diagram of texture coordinates of a first texture storage area and a second texture storage area provided by an embodiment of the present disclosure.

The first storage location and the second storage location are described below with reference to an example:

For example, assuming that the size of the first texture storage area is Width*Height, and the size of the second texture storage area is Width*1.5 Height. Width represents an image width and Height represents an image height. A part shown on the left of FIG. 5 is a coordinate of a storage location of the first texture storage area. The coordinate is expressed using a texture coordinate (that is, a UV coordinate with a coordinate value range of [0, 1]). For the first texture storage area, the texture coordinate (0, 0) represents a location where the actual width is 0 and the actual height is 0. The texture coordinate (1, 0) represents a location where the actual width is Width and the actual height is 0. The texture coordinate of (0, 1) represents a location where the actual width is 0 and the actual height is Height. The texture coordinate (1, 1) represents a location where the actual width is Width and the actual height is Height. A part shown on the right of FIG. 5 is a coordinate of a storage location of the second texture storage area. For the second texture storage area, the texture coordinate (0, 0) represents a location where an actual width is 0 and an actual height is 0. The texture coordinate (1, 0) represents a location where the actual width is Width and the actual height is 0. The texture coordinate (0, 1) represents a location where the actual width is 0 and the actual height is 1.5 Height. The texture coordinate (1, 1) represents a location where the actual width is Width and the actual height is 1.5 Height.

Taking the texture coordinate (0, ⅓) as an example, 0 in the texture coordinate (0, ⅓) represents that the ratio of the width of a location to be rendered currently to the width of the second texture storage area is 0, and ⅓ in the texture coordinate (0, ⅓) represents that the ratio of the height of the location to be rendered currently to the height of the second texture storage area is ⅓. That is, the texture coordinate (0, ⅓) represents the location where a lower left corner (that is, point 1 shown in the figure) of the Y area of the second texture storage area is located. The location is the first storage location. According to the storage location correspondence between the first texture storage area and the second texture storage area, in the first texture storage area, the second storage location corresponding to the first storage location is the location where (0, 0) of the first texture storage area is located (that is, point 2 shown in the figure).

It is to be noted that, in the above-mentioned example, when processing is performed by taking the original image data stored in the first texture storage area as a sample source and taking the second texture storage area as a target to be rendered, the size of the first texture storage area is the same as the size of the first storage area in the second texture storage area. In practical applications, the size of the first texture storage area and the size of the first storage area in the second texture storage area may also be different. In this case, during the processing, it is necessary to ensure that the size of the first texture storage area and the size of the first storage area in the second texture storage area are processed at the same size ratio so as to ensure that the storage locations correspond to each other.

By the embodiments of the present disclosure, image data to be converted is processed by the GPU calling the shader, which avoids a manner of computing pixel by pixel, can complete encoding format conversion of the image quickly, and improves the processing efficiency of converting the image data of the image to be processed in the source encoding format into the target image data in the target encoding format.

In order to explain how to determine the first storage location and the second storage location more clearly, a detailed description is provided below in combination with an example.

In one embodiment, the step of determining, according to a storage location correspondence between the first texture storage area and the second texture storage area, a second storage location corresponding to the texture coordinate in the first texture storage area includes:

determining a target storage area that the first storage location belongs in the second texture storage area, the target storage area being one of the first storage area and the second storage area;

converting, according to the storage location correspondence and the target storage area, the texture coordinate into a texture coordinate corresponding to the first texture storage area to obtain a converted texture coordinate; and determining a second storage location of the converted texture coordinate in the first texture storage area.

In an embodiment, the step of computing, according to the original image data corresponding to the second storage location, the target image data corresponding to the texture coordinate includes:

computing, according to the original image data corresponding to the second storage location, the target image data corresponding to the texture coordinate in an image data conversion manner corresponding to the target storage area.

In one embodiment, for any texture coordinate, the steps of determining the first storage location corresponding to the texture coordinate in the second texture storage area, and determining, according to a storage location correspondence, the second storage location corresponding to the texture coordinate in the first texture storage area may be implemented as follows:

determining the first storage location corresponding to the texture coordinate in the second texture storage area, and then determining which storage area of the second texture storage area the first storage location belongs to, that is, determining which area of the first storage area (that is, the Y area), the first sub-area (that is, the U area), or the second sub-area (that is, the V area) the first storage location belongs to. A storage area that the first storage location corresponding to the texture coordinate belongs is marked as a target storage area. Then, the texture coordinate is converted into a texture coordinate corresponding to the first texture storage area to obtain a converted texture coordinate according to a conversion manner corresponding to the target storage area and the storage location correspondence, and a second storage location of the converted texture coordinate in the first texture is determined. The second storage location corresponding to the converted texture coordinate in a first texture corresponds to the first storage location corresponding to the texture coordinate before conversion in a second texture.

That is, a current texture coordinate corresponds to the first storage location on the second texture, and the current texture coordinate is converted according to a mapping relationship (that is, the storage location correspondence) between the first texture storage area and the second texture storage area so as to obtain a converted texture coordinate. The converted texture coordinate corresponds to the second storage location on the first texture. Therefore, the second storage location of the first texture corresponds to the first storage location of the second texture.

In one embodiment, respective texture coordinates are used for representing respective locations of an object (that is, the second texture storage area) to be rendered currently. When the second storage location is determined, there may be several example cases as follows:

Any texture coordinate is regarded as the current texture coordinate. An axis in the texture coordinate for representing a horizontal direction is marked as an X-axis, and a coordinate in an X-axis direction is marked as an abscissa X. An axis in the texture coordinate for representing a vertical direction is marked as a Y-axis, and a coordinate in a Y-axis direction is marked as an ordinate X. In the following example, an actual size (that is, an image size) of the first texture is Width*Height, and an actual size of the second texture is Width*1.5 Height.

Case 1: In this case, the texture coordinate is represented by a UV coordinate, and the range of the UV coordinate is [0, 1]. The texture coordinate is accordance with a standard that the lower left corner is (0, 0) and the upper right corner is (1, 1), and which area of the second texture storage area the current texture coordinate belongs is determined according to an ordinate Y of the current texture coordinate UV1 and a first threshold (for example, ⅓). If the ordinate Y is greater than or equal to the first threshold, it indicates that the texture coordinate belongs to the Y area. According to the storage location correspondence and the conversion manner corresponding to the Y area, the ordinate Y is subtracted by ⅓ and is multiplied by 3/2, and the abscissa X of UV1 is kept unchanged, so that a converted texture coordinate UV2 can be obtained. The second storage location corresponding to the converted texture coordinate UV2 in the first texture storage area (an RGB texture storage area) corresponds to the first storage location corresponding to the texture coordinate UV1 before conversion in the second texture storage area (a YUV texture storage area).

For example, assuming that the current texture coordinate is (0.2, 0.5), since the ordinate Y (that is, 0.5) of the current texture coordinate is greater than the first threshold ⅓, it indicates that the current texture coordinate belongs to the Y area in the YUV texture. According to the storage location correspondence and the conversion manner corresponding to the area Y, the ordinate 0.5 of the current texture coordinate is subtracted by ⅓ and is multiplied by 3/2, and the abscissa 0.2 is kept unchanged, so that the converted texture coordinate (0.2, ¼) can be obtained. The storage location corresponding to the texture coordinate (0.2, ¼) in the RGB texture storage area corresponds to the storage location corresponding to the texture coordinate (0.2, 0.5) in the YUV texture storage area.

Case 2: Similarly, in this case, the texture coordinate is represented by a UV coordinate, and the range of the UV coordinate is [0, 1]. The texture coordinate is accordance with a standard that the lower left corner is (0, 0) and the upper right corner is (1, 1), and which area of the second texture storage area the current texture coordinate UV1 belongs is determined according to an ordinate Y of the current texture coordinate UV1 and a first threshold (for example, ⅓). If the ordinate Y is less than the first threshold, the texture coordinate UV1 belongs to the second storage area of the second texture storage area. Which area of the second texture storage area the current texture coordinate UV1 belongs is further determined according to the abscissa X of the current texture coordinate and a second threshold (for example, ½). If the abscissa X is less than the second threshold, the texture coordinate belongs to a U area. According to the storage location correspondence and the conversion manner corresponding to the U area, the abscissa X of the current texture coordinate is multiplied by 2, and the ordinate Y is multiplied by 3, so that the converted texture coordinate UV2 can be obtained. The second storage location corresponding to the UV2 in the first texture storage area corresponds to the first storage location corresponding to the UV1 in the second texture storage area.

For example, assuming that the current texture coordinate is (0.1, 0.2), since the ordinate Y (that is, 0.2) thereof is less than the first threshold ⅓, it indicates that the current texture coordinate belongs to the second storage area in the second texture storage area. Since the abscissa X (that is, 0.1) is less than the second threshold ½, the texture coordinate belongs to the U area. According to the storage location correspondence and the conversion manner corresponding to the U area, the abscissa 0.1 is multiplied by 2 and the ordinate 0.2 is multiplied by 3, so that the converted texture coordinate (0.2, 0.6) can be obtained. The storage location corresponding to the texture coordinate (0.2, 0.6) in the first texture storage area corresponds to the first storage location of the texture coordinate (0.1, 0.2) in the second texture storage area.

Case 3: In this case, the texture coordinate is represented by a UV coordinate, and the range of the UV coordinate is [0, 1]. The texture coordinate is accordance with a standard that the lower left corner is (0, 0) and the upper right corner is (1, 1), and which area of the second texture storage area the current texture coordinate UV1 belongs is determined according to an ordinate Y of the current texture coordinate UV1 and a first threshold (for example, ⅓). If the ordinate Y is less than the first threshold, the texture coordinate belongs to the second storage area of the second texture. Which area of the second texture storage area the current texture coordinate UV1 belongs is further determined according to the abscissa X of UV1 and a second threshold (for example, ½). If the abscissa X is greater than or equal to the second threshold, the texture coordinate belongs to a V area. According to the storage location correspondence and the conversion manner corresponding to the V area, the abscissa X is subtracted ½ and is multiplied by 2, and the ordinate Y is multiplied by 3, so that the converted texture coordinate UV2 can be obtained. The second storage location corresponding to UV2 in the first texture storage area corresponds to the first storage location corresponding to UV1 in the second texture storage area.

For example, assuming that the current texture coordinate is (0.8, 0.2), since the ordinate Y (that is, 0.2) of the current texture coordinate is less than the first threshold ⅓, it indicates that the current texture coordinate belongs to the second storage area in the second texture storage area, and since the abscissa X (that is, 0.1) is greater than the second threshold ½, the texture coordinate belongs to the V area. According to the storage location correspondence and the conversion manner corresponding to the V area, the abscissa 0.8 is subtracted by ½ and is multiplied by 2, and the ordinate 0.2 is multiplied by 3, so that the converted texture coordinate (0.6, 0.6) can be obtained, and the storage location corresponding to the texture coordinate (0.6, 0.6) in the first texture storage area corresponds to the second storage location corresponding to the texture coordinate (0.8, 0.2) in the second texture storage area.

The partial code corresponding to the three cases are as follows:

may be acquired, that is, a color value corresponding to the second storage location is acquired; and target image data corresponding to the texture coordinate is computed by using an image data conversion formula corresponding to the target storage area that the texture coordinate belongs.

In an example, when the image data of the image to be processed is applied to the field of video encoding, the original image data of the image to be processed in the source encoding format (that is, the RGB encoding format) needs to be converted into target image data in a target encoding format (that is, a YUV encoding format). Since a video encoder requires a video input in a YUV 4:2:0 format, when sampling is performed by taking the original image data of the image to be processed as a sampling source, a sampling format of YCbCr 4:2:0 may be used. YCbCr is proposed as a part of a digital television standard (ITU-R BT. 601) in a development process of a video standard of the World Digital Organization, where ITU=International Telecommunication Union, R=Radiocommunication Sector, BT=Broadcasting service (television), and is a refurbished version of YUV after being scaled and offset. Where Y has

```
//Define flags of three color components, and mark the storage area
corresponding to a currently processed texture coordinate in a YUV texture storage area (that
is, the second texture storage area)
    int y=0; //Flag corresponding to a Y component
    int u=0; //Flag corresponding to a U component
    int v=0; //Flag corresponding to a V component
    //Scale the texture coordinate, and map a sampling result to a designated area
of the YUV texture storage area
    if (i. uv. y>=1.0/3.0)//If the ordinate Y in the texture coordinate is greater than
or equal to 1/3, take the upper 2/3 of the texture storage area as the storage area for the Y
component
    {
        i. uv. y=(i. uv. y-1.0/3.0)*3.0/2.0;//Substract the ordinate Y in the texture
coordinate by 1/3 and multiply by 3/2
        y=1;//The texture coordinate currently to be processed corresponding to
the Y area
    }
    else
    {
        i. uv. y=i. uv. y*3.0;//Scale the ordinate Y in the texture coordinate to the
range of [0, 1]
        //Take 1/3 below the texture as a storage area for the U component and
the V component
        if (i. uv. x <0.5)//If the abscissa X in the texture coordinate is less than
1/2, store the U component in the left half part of the lower 1/3 part of the YUV texture
storage area, that is, in the U area
        {
        i. uv. X=i. uv. x*2.0;//Multiply the abscissa in the texture coordinate by 2
        u=1;//The texture coordinate currently to be processed corresponding to
the U area
        }
        else//Store the V component in the right half part of the lower 1/3 part of
the YUV texture storage area, that is, in the V area
        {
        i. uv. x=(i. uv. X-0.5)*2.0;//Substract the abscissa in the texture
coordinate by 1/2 and multiply by 2
        v=1;//The texture coordinate currently to be processed corresponding to
the V area
        }
    }
```

The i. uv. y represents the ordinate Y of the texture coordinate, and the i. uv. x represents the abscissa X of the texture coordinate.

It may be understood that the above is only an example, and the embodiments of the present disclosure is not limited herein.

After the second storage location corresponding to each texture coordinate in the first texture is determined according to the above manner, original image data of an image to be processed corresponding to the second storage location the same meaning as Y in YUV, and Cb and Cr both refer to colors. Y in YCbCr refers to a luminance component, Cb refers to a blue chrominance component, and Cr refers to a red chrominance component.

The image data conversion formula is a formula for converting the RGB encoding format into the YUV encoding format, that is, a formula for converting the YCbCr and RGB with each other. Three formulas are mainly included, respectively a Y formula, a U formula, and a V formula, which are specifically as follows:

US 12,597,225 B2

17

The $Y$ formula is: $Y=0.257*R+0.504*G+0.098*B+16$.

The $U$ formula is: $U=-0.148*R-0.291*G+0.439*B+128$.

The $V$ formula is: $V=0.439*R-0.368*G-0.071*B+128$.

By the embodiments of the present disclosure, each color value of a target to be rendered (that is, the second texture storage area) in the first texture storage area may be determined in a coordinate conversion manner, and corresponding conversion is performed according to a corresponding original image data conversion formula. In this process, since each texture coordinate is processed by a GPU calling a shader in a parallel processing manner, the processing speed is very high, and the conversion efficiency is greatly improved.

In one embodiment, the image to be processed is a virtual scene image in a gaming scene, the electronic device is a user terminal, and the method further includes:

reading target image data from the second texture storage area;

converting the read target image data into image data to be displayed corresponding to the source encoding format; and displaying the virtual scene image based on the image data to be displayed.

In one embodiment, taking the gaming scene as an example, the gaming scene may be a normal gaming scene or a cloud gaming scene, which is not limited herein. In addition, one image to be processed is a virtual scene image in the gaming scene, when there is a demand that the encoding format of the virtual scene image is the RGB encoding format and the image in the RGB encoding format needs to be displayed on a target terminal, the virtual scene image may be displayed on the target terminal in the following manner.

As described above, the original image data of the image to be processed in the source encoding format (that is, the virtual scene image data in the RGB encoding format) may be converted into the target image data in the target encoding format (that is, the image data in the YUV encoding format), that is, an RGB image in the gaming scene may be converted into a YUV image. Then, the target image data is read from the second texture storage area, that is, YUV image data is read from the second texture, the read YUV image data is converted into the image data to be displayed corresponding to the source encoding format (that is, the RGB encoding format), and the virtual scene image (that is, a game picture) is displayed based on the image data to be displayed.

The method for converting the YUV image data into RGB image data may refer to the method for converting the RGB image data into the YUV image data described above. That is, the method for converting the RGB image data into the YUV image data is used reversely, which will not be described in detail here.

By the embodiments of the present disclosure, the target image data in the target encoding format may be converted into the image data to be displayed in the source encoding format as required, which can flexibly convert an encoding format of an image as required, meet various requirements, and improve applicability.

In one embodiment, the image to be processed is at least one virtual scene image in a cloud gaming scene, the electronic device is a cloud gaming server, and the method further includes:

reading the target image data from the second texture storage area corresponding to each image in the at least one virtual scene image;

performing image encoding processing on the read target image data to obtain a video stream; and transmitting the video stream to a user terminal, so that the user terminal plays the video stream.

In one embodiment, in the cloud gaming scene, in a process that the cloud gaming server encodes a scene picture in a game into a video stream, for example, a digital video compression format of the video stream is an H264 format, since the image data in the YUV encoding format needs to be used in this process, and the scene picture in the game is the original image data in the RGB encoding format, the original image data in the RGB encoding format needs to be converted into the target image data in the YUV encoding format.

The image to be processed is each image of at least one virtual scene image in a cloud gaming scene, and the encoding format of each virtual scene image is the RGB encoding format. According to the manner described above, the target image data stored in the second texture storage area respectively corresponding to each virtual scene image is obtained, and the target image data may also be understood as a rendered game picture; and then, the cloud gaming server reads the target image data from the second texture storage area respectively corresponding to each virtual scene image, and performs image encoding processing on the read target image data, that is, performs video compression processing to obtain a video stream. Each virtual scene image corresponds to one frame of image in the video stream, and the video stream is transmitted to the user terminal. The user terminal only needs a basic video decompression capability without any high-end processor and video card, that is, the user terminal only needs to decompress and play the received video stream.

By the embodiments of the present disclosure, the cloud gaming server may obtain the video stream based on a rendered game picture, and transmit the video stream to the user terminal through a network. The user terminal may play the video stream transmitted by the cloud gaming server only by the basic video decompression capability without any high-end processor and video card. In this process, the cloud gaming server may convert an encoding manner more efficiency by the image processing method in the embodiments of the present disclosure, speed up the processing speed of the video stream of a game, reduce the computing pressure of a CPU in the server, greatly improve the load capacity of the cloud gaming; optimize the gaming experience, and also reduce the cost of the cloud gaming server.

Figure 6:
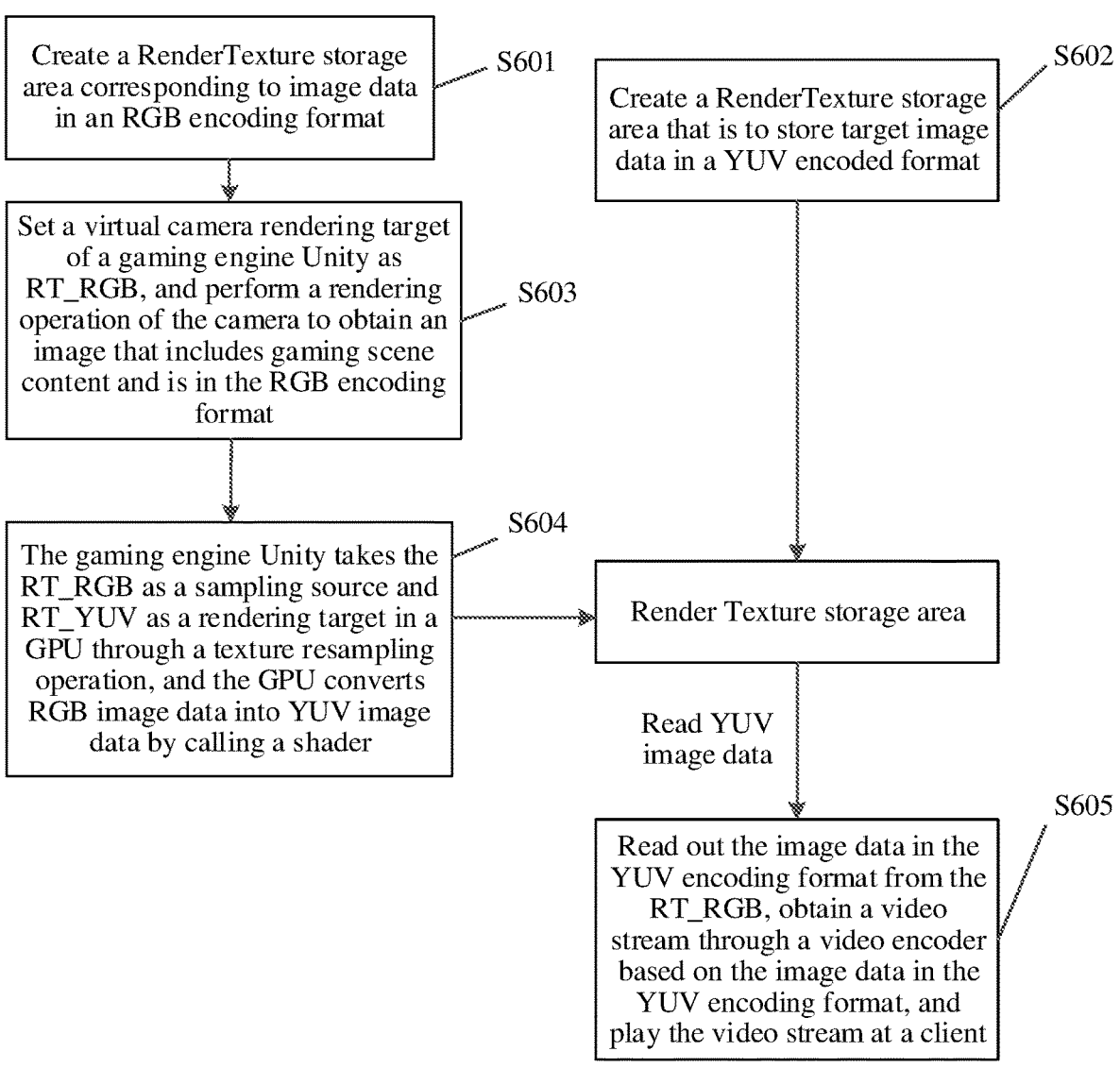
FIG. 6 is a schematic flowchart of an image processing method provided by an embodiment of the present disclosure.

In order to understand the image processing method in the embodiments of the present disclosure more clearly, a detailed description is provided below in combination with a cloud gaming scene as an example. In a cloud gaming scene, in a process of encoding a scene picture in a game into a video stream, since a YUV-encoded image needs to be used in this process, and the scene picture in the game is an RGB-encoded image, the RGB-encoded image needs to be converted into the YUV-encoded image. The RGB-encoded image may be converted into the YUV-encoded image by the image processing method in the embodiments of the present disclosure. As shown in FIG. 6, a detailed process is as follows:

Step 601. Create a RenderTexture storage area corresponding to image data in an RGB encoding format. The texture is a storage area, and is represented by RT_RGB. The RT_RGB, namely, the first texture storage area described above, is used for storing a game picture captured by a scene camera of a game engine. The embodiments of the present disclosure does not make a limitation on a specific engine of the game engine, for example, the game engine may be a game engine Unity, and the game picture is the image data in the RGB encoding format, that is, the original image data of the image to be processed described above. A size of the storage area RT_RGB is consistent with an image size of the game picture, for example, both the size of the storage area RT_RGB and the image size of the game picture are Width*Height. It may be understood that the image size of the game picture is not limited in the embodiments of the present disclosure, and may be determined according to practical requirements, for example, may be adapted to the screen size of a corresponding user terminal. In one embodiment, the image size of the game picture is 1920*1080. The format of the RT_RGB storage area is not limited in the embodiments of the present disclosure, for example, the format of the RT_RGB storage area may be BGRA32, ARGB32, and the like.

Step 602. Create a RenderTexture storage area that is to store target image data in a YUV encoding format. The texture is a storage area, and is represented by RT_YUV. The RT_YUV, namely, the above-mentioned second texture storage area, is used for storing the target image data in the YUV encoding format (that is, the target image data in the target encoding format described above) converted by the image data in the RGB encoding format. A size of the storage area RT_YUV is Width*1.5 Height, and a height of the storage area RT_YUV is 1.5 times the height of the storage area RT_RGB. Assuming that an image size of the game picture is 1920*1080, the size of the storage area RT_YUV is 1920*1620. The format of the storage area RT_YUV is not limited in the embodiments of the present disclosure, for example, the format of the storage area RT_YUV may be an R8 format (that is, containing only one color channel), and the like.

With reference to FIG. 3, FIG. 3 is a schematic layout diagram of a storage area RT_YUV. It can be seen that the storage area RT_YUV includes three areas, that is, a Y area, a U area, and a V area shown in the figure, and the aspect ratio of the Y area needs to be kept consistent with the aspect ratio of the U area and the V area. The height of the Y area is ⅔ of the height of the RT_YUV, the width of the Y area is consistent with the width of the RT_YUV, the heights of the U area and the V area are both ⅓ of the height of the RT_YUV, and the widths of the U area and the V area are both ½ of the width of the RT_YUV.

Step 603. Set a virtual camera rendering target of the gaming engine Unity as RT_RGB, and perform a rendering operation of the camera to obtain an image that includes gaming scene content and is in the RGB encoding format. That is, a current game picture is obtained, and the current game picture is captured and stored in the storage area RT_RGB. That is, as shown in the figure, the virtual camera is called to render, and the obtained game picture is written into an RGB texture (RT_RGB).

Step 604. The gaming engine Unity takes the RT_RGB as a sampling source and the RT_YUV as a rendering target (that is, a target texture storage area, that is, a second texture storage area) in the GPU through a texture resampling operation, and the GPU converts RGB image data into YUV image data by calling a shader (that is, performs resampling on the texture by using the shader as shown in the figure). The location of each texture point (which may be understood as an image point in the YUV encoding format) in the RT_YUV has a mapping relationship with each pixel point of the RGB image data in the RT_RGB, and the main process is that the GPU, by calling the shader, in parallel converts each pixel point in the RT_RGB corresponding to each texture point of the RT_YUV into a corresponding color value through a conversion formula.

Figure 7:
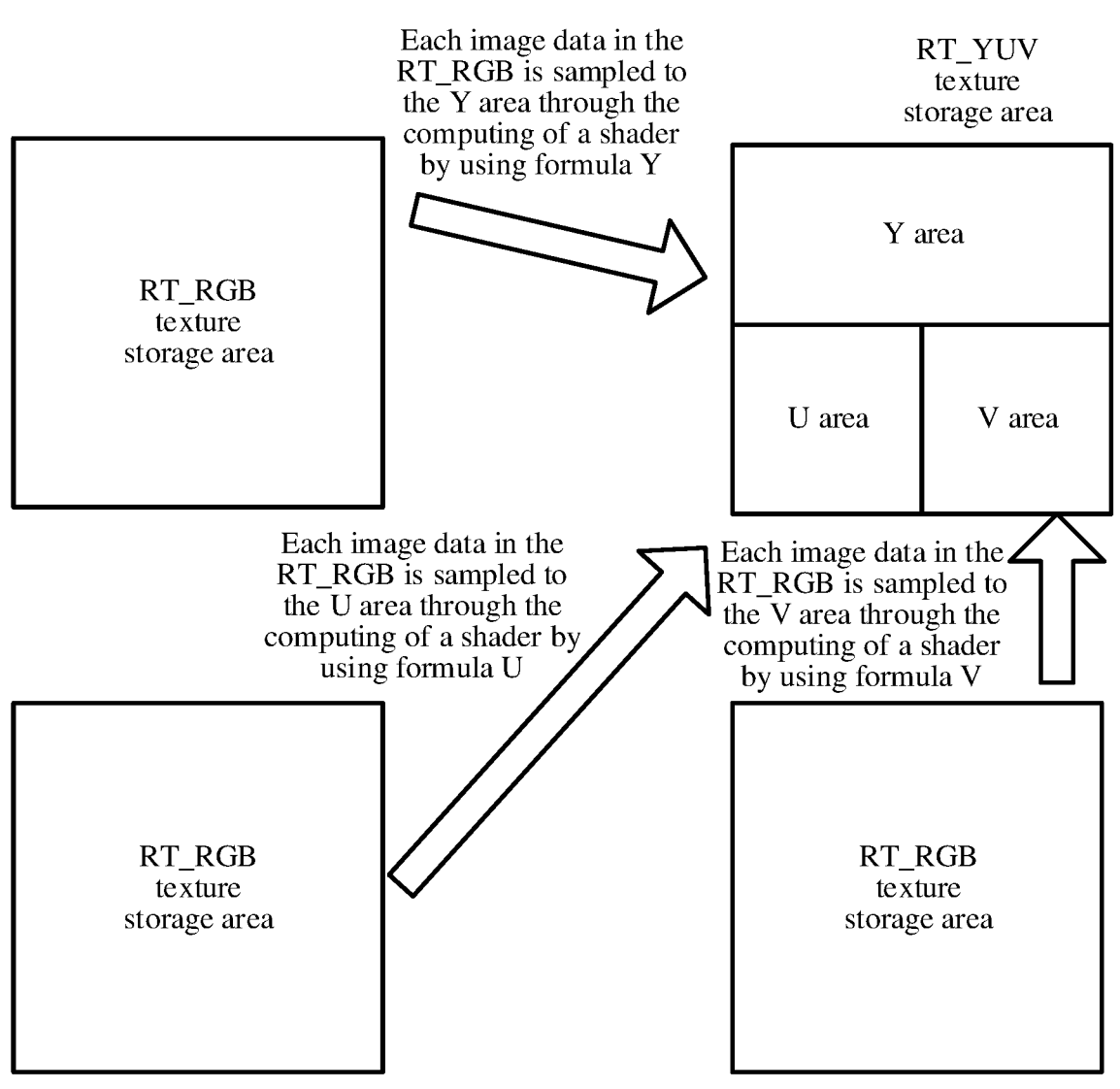
FIG. 7 is a schematic diagram of conversion of an image encoding format provided by an embodiment of the present disclosure.

The main process is shown in FIG. 7. Each image data in the RT_RGB is sampled to the Y area by the computing of the shader by using the Y formula. Each image data in the RT_RGB is sampled to the U area by the computation of the shader by using the U formula. Each image data in the RT_RGB is sampled to the V area by the computation of the shader by using the V formula.

Figure 8:
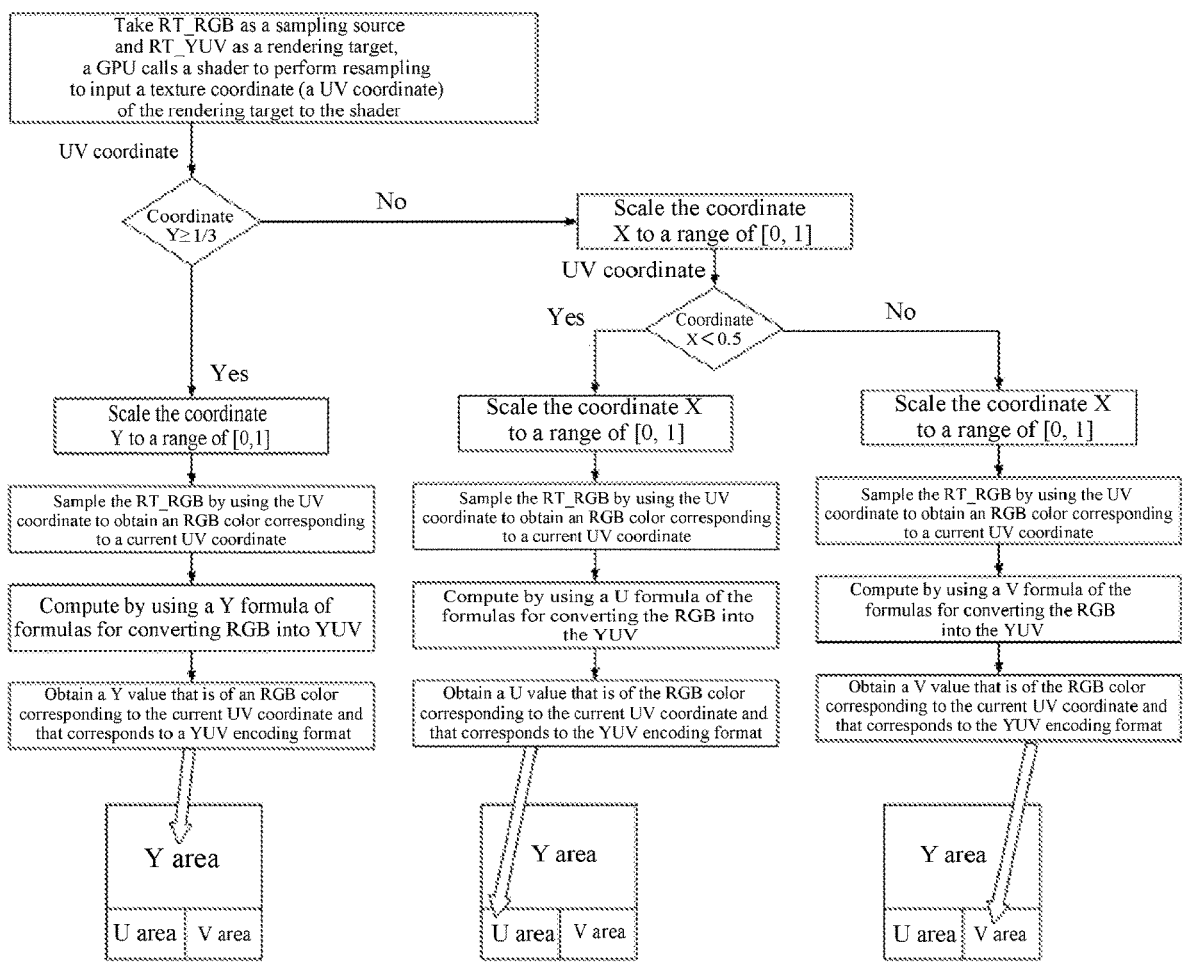
FIG. 8 is a schematic flowchart of conversion of an image encoding format provided by an embodiment of the present disclosure.

Specifically, a process of converting the game picture in the RGB encoding format into an image in the YUV encoding format is shown in FIG. 8 For the convenience of description, the game picture may be referred to as an original image, and the rendering target may be referred to as a target image. A specific process is as follows:

Step S1. Take RT_RGB as a sampling source and RT_YUV as a rendering target, the GPU calls a shader to perform resampling to input a texture coordinate (a UV coordinate) of the rendering target to the shader. That is, the GPU inputs the texture coordinate, that is, the UV coordinate, of a target image for the shader.

Here, the UV coordinate refers to which location of the target image is to be rendered by the shader executed by the GPU currently. Where, U in the UV coordinate is a horizontal direction, V is a vertical direction, an axis in the UV coordinate for representing the horizontal direction is taken as an X axis, the coordinate in the X axis direction is marked as an abscissa X, an axis in the UV coordinate for representing the vertical direction is taken as a Y axis, and the coordinate in the Y axis direction is marked as an ordinate Y.

Step S2. It is determined that which location in the RT_YUV is to be rendered currently by the shader according to the UV coordinate.

A rendered area corresponding to the currently input UV coordinate may be determined according to the YUV layout shown in FIG. 3, that is, which area of the Y area, the U area, and the V area is to be rendered currently is determined. Then, image data corresponding to the UV coordinate in the RT_RGB is acquired according to a mapping relationship between the RT_RGB and the RT_YUV, and computing is performed by using conversion formulas (that is, the Y formula, the U formula, and the V formula) of the corresponding areas to obtain a value of the color component corresponding to the current UV coordinate. Several example cases are as follows:

Case 1: Each image data of the RT_RGB is computed by the shader and is sampled to the Y area by using the Y formula corresponding to the conversion from the RGB image data into the Y component in the YUV image data.

In one embodiment, if the ordinate Y in the UV coordinate is greater than or equal to ⅓, it indicates that the current UV coordinate corresponds to the Y area, and the Y formula needs to be used for computing. The ordinate Y is scaled to a range of [0, 1], and the RT_RGB is sampled by using the UV coordinate to obtain an RGB color corresponding to the current UV coordinate, that is, the RGB image data corresponding to the current UV coordinate is acquired from an original image. Then, the Y formula for converting from the RGB image data into the YUV image data is used for computing, and a corresponding Y value is obtained by the RGB image data corresponding to the current UV coordinate according to the Y formula.

The $Y$ formula is: $Y=0.257*R+0.504*G+0.098*B+16$.

For example, in the layout diagram of the RT_YUV (that is, the second texture storage area shown in the figure) shown in FIG. 5, the lower left corner is (0, 0), the positive direction of the X axis of the UV coordinate is to the right, and the positive direction of the Y axis of the UV coordinate is to the up. Taking UV coordinate (0, ⅓) as an example, the UV coordinate (0, ⅓) is a 0 point of the Y area of the RT_YUV, the UV coordinate (0, ⅓) corresponds to a point (0, 0) of the RT_RGB, and in this case, the point (0, 0) of the RT_RGB needs to be sampled.

Case 2: Each image data of the RT_RGB is computed by the shader and is sampled to the U area by using the U formula corresponding to the conversion from the RGB image data into the U component in the YUV image data.

In one embodiment, if the ordinate Y in the UV coordinate is less than ⅓, the ordinate Y is scaled to the range of [0, 1], and the abscissa X is further determined. If the abscissa X is less than or equal to ½, it indicates that the current UV coordinate corresponds to the U area, and the U formula needs to be used for computing. The abscissa X is scaled to a range of [0, 1], and the RT_RGB is sampled by using the UV coordinate to obtain an RGB color corresponding to the current UV coordinate, that is, the RGB image data corresponding to the current UV coordinate is acquired from the original image. Then, the U formula for converting from the RGB image data into the YUV image data is used for computing, and a corresponding Y value is obtained by the RGB image data corresponding to the current UV coordinate according to the Y formula.

The $U$ formula is: $U=-0.148*R-0.291*G+0.439*B+128$.

Case 3: Each image data of the RT_RGB is computed by the shader and is sampled to the V area by using the V formula corresponding to the conversion from the RGB image data into the V component in the YUV image data.

In one embodiment, if the ordinate Y in the UV coordinate is less than ⅓, the ordinate Y is scaled to the range of [0, 1], and the abscissa X is further determined. If the abscissa X is greater than ½, it indicates that the current UV coordinate corresponds to the V area, and the V formula needs to be used for computing. The abscissa X is scaled to a range of [0, 1], and the RT_RGB is sampled by using the UV coordinate to obtain an RGB color corresponding to the current UV coordinate, that is, the RGB image data corresponding to the current UV coordinate is acquired from the original image. Then, the V formula for converting from the RGB image data into the YUV image data is used for computing, and a corresponding V value is obtained by the RGB image data corresponding to the current UV coordinate according to the V formula.

The $V$ formula is: $V=0.439*R-0.368*G-0.071*B+128$.

In the above-mentioned manner, after all the data of the Y area, the U area and the V area have been sampled, a resampling result is written into the RT_YUV texture storage area. The resampling result is the obtained target image data (that is, the image data in the YUV encoding format).

Step S605. The image data in the YUV encoding format can be obtained according to the above-mentioned process, subsequent program logic is continued to be executed, the image data in the YUV encoding format is read out from the RT_RGB, a video stream is obtained based on the image data in the YUV encoding format by a video encoder, and the video stream is played at the client. The client is a client in the above-mentioned user terminal, and may be a client in various forms, which is not limited herein.

In one embodiment, when the image data in the YUV encoding format is read out from the RT_RGB, the data in the Y area may be read in blocks and the data in the U and V areas may be read in rows according to the layout diagram shown in FIG. 3, and a specific process is as follows:

assuming that the obtained YUV image data is stored in the RT_YUV in the manner shown in FIG. 4, when reading the data of the Y area, reading the data of the Y area in blocks, and when reading the data of the U area and the V area, reading the data of the U area and the V area in rows. For example, the area where Y1 to Y12 are located constitutes one area block, which is marked as area block 1, and the area where Y13 to Y24 are located constitutes one area block, which is marked as area block 2. The row where U1 to U3 and V1 to V3 are located is marked as row 1, and the row where U4 to U6 and V4 to V6 are located is marked as row 2. Data of Y1 to Y12 and the UV component shared by same, that is, U1 to U3 and V1 to V3, may be obtained by reading the data of area block 1 in blocks and reading the data in row 1 in rows. Data of Y13 to Y24 and the UV component shared by same, that is, U4 to U6 and V4 to V6, may be obtained by reading the data of area block 2 in blocks and reading the data in row 2 in rows.

By the embodiments of the present disclosure, when the original image data of the image to be processed in the source encoding format is converted into the target image data in the target encoding format, parallel processing may be performed on the image data to be converted by the GPU calling the shader in a manner of storing the image data by creating a texture storage area, which avoids a manner of computing pixel by pixel, can complete image conversion quickly, and improves the processing efficiency of converting the image data of the image to be processed in the source encoding format into the target image data in the target encoding format.

Figure 9:
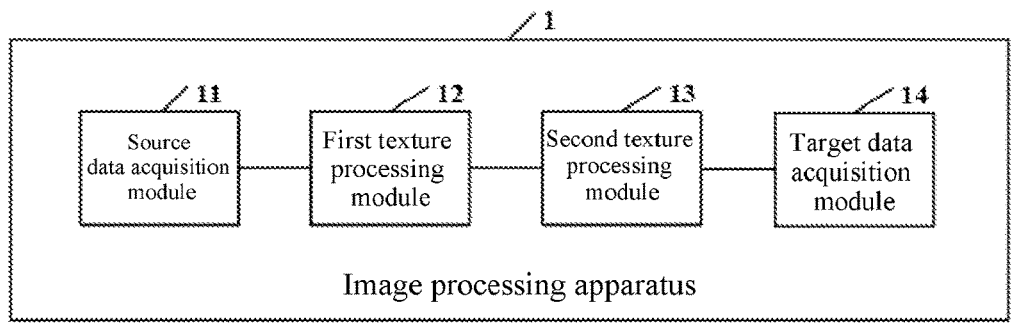
FIG. 9 is a schematic structural diagram of an image processing apparatus provided by an embodiment of the present disclosure.

Reference is made to FIG. 9, which is a schematic structural diagram of an image processing apparatus provided by an embodiment of the present disclosure. An image processing apparatus 1 provided by the embodiments of the present disclosure includes:

a source data acquisition module 11, configured to acquire an image size of an image to be processed and original image data of the image to be processed, a color encoding format corresponding to the original image data being a source encoding format;

a first texture processing module 12, configured to create a first texture storage area according to the image size and store image data of the image to be processed into the first texture storage area;

a second texture processing module 13, configured to create a second texture storage area for storing target image data to be generated according to the image size and target encoding format, the encoding format corresponding to the target image data being the target encoding format; and a target data acquisition module 14, configured to perform encoding format conversion on the original image data stored in the first texture storage through a shader called by a GPU to generate target image data corresponding to each texture coordinate of the second texture storage area, and store the target image data corresponding to the each texture coordinate into a corresponding storage location in the second texture storage area.

In an embodiment, the target data acquisition module 14 is further configured to:

determine, through the shader called by the GPU, a first storage location corresponding to the texture coordinate in the second texture storage area for any texture coordinate of the second texture storage area;

determine, according to a storage location correspondence between the first texture storage area and the second texture storage area, a second storage location corresponding to the texture coordinate in the first texture storage area; and compute, according to the original image data corresponding to the second storage location, the target image data corresponding to the texture coordinate, and store the target image data into the first storage location.

In an embodiment, the source encoding format is a red-green-blue RGB encoding format, and the target encoding format is a luminance-chrominance (YUV) encoding format. The second texture storage area includes: a first storage area for storing a luminance component in the YUV encoding format and a second storage area for storing a chrominance component in the YUV encoding format. The first storage area and the second storage area are continuous, each luminance component stored in the first storage area corresponds to one first chrominance component and one second chrominance component stored in the second storage area, and target image data of the first chrominance component and target image data of the second chrominance component are continuously stored in the second storage area.

In an embodiment, the size of the first storage area is the same as the image size, the second storage area includes a first sub-area corresponding to the first chrominance component and a second sub-area corresponding to the second chrominance component, the first sub-area and the second sub-area have the same size, the first storage area, the first sub-area, and the second sub-area have the same the aspect ratio, and the widths of the first sub-area and the second sub-area are determined by the target encoding format.

In an embodiment, the target data acquisition module 14 is further configured to:

determine a target storage area that the first storage location belongs in the second texture storage area, the target storage area being one of the first storage area and the second storage area;

convert, according to the storage location correspondence and the target storage area, the texture coordinate into a texture coordinate corresponding to the first texture storage area to obtain a converted texture coordinate; and determine a second storage location of the converted texture coordinate in the first texture storage area.

In an embodiment, the target data acquisition module 14 is further configured to:

compute, according to the original image data corresponding to the second storage location, the target image data corresponding to the texture coordinate in an image data conversion manner corresponding to the target storage area. In an embodiment, the target data acquisition module 14 is further configured to:

perform, through the shader called by the GPU and in a parallel computing manner, encoding format conversion on the original image data stored in the first texture storage area so as to obtain the target image data corresponding to each texture coordinate.

In an embodiment, the image to be processed is a virtual scene image in a gaming scene, the apparatus further includes an image display module, and the module is configured to:

read target image data from the second texture storage area;

convert the read target image data into image data to be displayed in the source encoding format; and display the virtual scene image based on the image data to be displayed.

In one embodiment, the image to be processed is each image of at least one virtual scene image in a cloud game, the apparatus further includes a video stream generation module, and the module is configured to:

read target image data from the second texture storage area corresponding to each image of the at least one virtual scene image;

perform image encoding processing on the read target image data to obtain a video stream; and transmit the video stream to a user terminal, so that the user terminal plays the video stream.

By the embodiments of the present disclosure, when the image data of the image to be processed in the source encoding format is converted into the target image data in the target encoding format, the original image data to be converted may be processed by the GPU calling the shader in a manner of storing the image data by creating a texture storage area, which avoids a manner of computing pixel by pixel, can complete image conversion quickly, and greatly improves the processing efficiency of converting the original image data of the image to be processed in the source encoding format into the target image data in the target encoding format.

In a specific implementation, the image processing apparatus 1 may execute implementations as provided in various steps in FIG. 2 through various functional modules built therein, and specific reference may be made to the implementations provided by the various steps, which will not be described in detail herein.

The term module (and other similar terms such as submodule, unit, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The above description mainly describes that an execution subject is hardware to implement the image processing method in the present disclosure. However, the execution subject of the image processing method in the present disclosure is not limited to hardware. The execution subject of the image processing method in the present disclosure may also be software. The image processing apparatus can be a computer program (including program code) running in a computer device, for example, the image processing apparatus is an application software. The apparatus may be configured to perform corresponding steps in methods provided by embodiments of the present disclosure.

In some embodiments, the image processing apparatus provided by the embodiments of the present disclosure may be implemented through a combination of hardware and software. As an example, the image processing apparatus provided by the embodiments of the present disclosure may be a processor in the form of a hardware decoding processor which is programmed to execute the image processing method provided by the embodiments of the present disclosure. For example, the processor in the form of the hardware decoding processor may use one or more application specific integrated circuits (ASICs), DSPs, programmable logic devices (PLDs), complex programmable logic devices (CPLDs), field programmable gate arrays (FPGAs) or other electronic components.

In other embodiments, the image processing apparatus provided by the embodiments of the present disclosure can be implemented in software. The image processing apparatus 1 shown in FIG. 9 may be software in the form of a program, a plug-in, and the like, and includes a series of modules, including a source data acquisition module 11, a first texture processing module 12, a second texture processing module 13, and a target data acquisition module 14, which are configured to implement the image processing method provided by the embodiments of the present disclosure.

Figure 10:
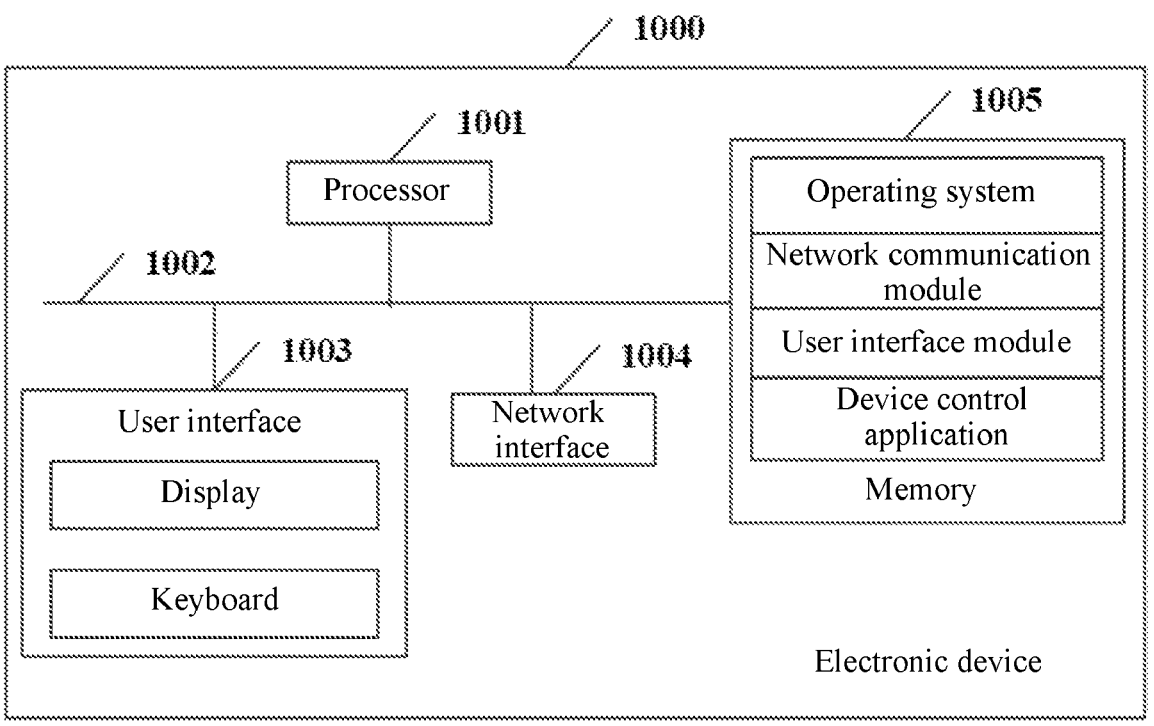
FIG. 10 is a schematic structural diagram of an electronic device provided by an embodiment of the present disclosure.

Reference is made to FIG. 10, which is a schematic structural diagram of an electronic device provided by an embodiment of the present disclosure. As shown in FIG. 10, the electronic device 1000 in this embodiment may include: a processor 1001, a network interface 1004, and a memory 1005. In addition, the electronic device 1000 may further include: a user interface 1003 and at least one communication bus 1002. The communication bus 1002 is configured to implement connection and communication between the components. The user interface 1003 may include a display and a keyboard, and in some embodiments, the user interface 1003 may further include a standard wired interface and a standard wireless interface. The network interface 1004 may include a standard wired interface and a standard wireless interface (for example, a Wi-Fi interface). The memory 1005 may be a high-speed random access memory (RAM), or may be a non-volatile memory, for example, at least one magnetic disk memory. The memory 1005 may further be at least one storage apparatus that is located far away from the processor 1001. As shown in FIG. 10, the memory 1005 used as a computer-readable storage medium may include an operating system, a network communication module, a user interface module, and a device-control application program.

In the electronic device 1000 shown in FIG. 10, the network interface 1004 may provide a network communication function. The user interface 1003 is mainly used as an interface for a user to input, and the processor 1001 may be configured to call a computer program stored in the memory 1005.

It is to be understood that in some embodiments, the processor 1001 may be a central processing unit (CPU), or may also be another general purpose processor, digital signal processor (DSP), application specific integrated circuit (ASIC), field-programmable gate array (FPGA), or another programmable logic device, discrete gate or transistor logic device, discrete hardware components, or the like. The general-purpose processor may be a microprocessor, or the processor may also be any processor, or the like. The memory may include a read-only memory and a random access memory, and provide instructions and data for the processor. A part of the memory may further include a non-volatile random access memory. For example, the memory may further store device type information.

In a specific implementation, the electronic device 1000 can perform the implementations as provided in various steps in FIG. 2 through various functional modules built therein, and specific reference may be made to the implementations as provided in the various steps, which will not be described in detail herein.

An embodiment of the present disclosure further provides a computer-readable storage medium. The computer-readable storage medium stores a computer program to be executed by a processor to implement the method provided by various steps in FIG. 2, and specific reference may be made to the implementations as provided in the various steps, which will not be described in detail herein.

The computer-readable storage medium may be an internal storage unit of the image processing apparatus provided in any of the above-mentioned embodiments, for example, a hard disk or a memory of an electronic device. The computer-readable storage medium may also be an external storage device of the electronic device, for example, a plug-in hard disk, a smart media card (SMC), a secure digital (SD) card, a flash card, and the like provided on the electronic device. The computer-readable storage medium may further include a magnetic disk, an optical disk, a read-only memory (ROM), a random access memory (RAM), or the like. Further, the computer-readable storage medium may further include both internal storage unit and external storage device of the electronic device. The computer-readable storage medium is configured to store the computer program and other programs and data required by the electronic device. The computer-readable storage medium may also be configured to temporarily store data that has been or will be output.

An embodiment of the present disclosure provides a computer program product or a computer program. The computer program product or the computer program includes computer instructions. The computer instructions are stored in a computer-readable storage medium. A processor of the electronic device reads the computer instructions from the computer-readable storage medium, and the processor executes the computer instructions to enable the computer device to perform the method provided by any of the implementations in FIG. 2 described above.

The terms "first", "second" and the like in the claims, description, and drawings of the present disclosure are used for distinguishing different objects, and are not used for describing a specific sequence. In addition, the terms "include" and "have" and any variations thereof are intended to cover non-exclusive inclusions. For example, a process, a method, a system, a product, or a device that includes a series of steps or units is not limited to the listed steps or units, and instead, may include a step or unit that is not listed, or may further include another step or unit that is intrinsic to the process, the method, the product, or the device. "Embodiment" mentioned herein means that particular features, structures, or characteristics described with reference to the embodiments may be included in at least one embodiment of the present disclosure. The term appearing at different places of the specification may not refer to the same embodiment or an independent or alternative embodiment that is mutually exclusive with another embodiment. A person skilled in the art explicitly or implicitly understands that the embodiments described in the specification may be combined with other embodiments. The term "and/or" used in the specification and the appended claims of the present disclosure refers to and includes any and all possible combinations of one or more of the associated listed items.

A person of ordinary skill in the art may be aware that, units and algorithm steps of various examples described in the embodiments disclosed herein may be implemented by using electronic hardware, computer software, or a combination thereof. To clearly describe interchangeability between the hardware and the software, compositions and steps of various examples have been generally described according to functions in the above-mentioned descriptions. Skilled artisans may implement the described functions in varying ways for each particular application, but such implementation decisions should not be interpreted as causing a departure from the scope of the present disclosure.

What is disclosed above is merely exemplary embodiments of the present disclosure, and certainly is not intended to limit the scope of the claims of the present disclosure. Therefore, equivalent variations made in accordance with the claims of the present disclosure shall fall within the scope of the present disclosure.

What is claimed is:

1. An image processing method, performed in an electronic device, comprising:

acquiring an image size of an image and original image data of the image, a color encoding format corresponding to the original image data being a source encoding format;

creating a first texture storage area according to the image size, and storing image data of the image into the first texture storage area;

creating, according to the image size and a target encoding format, a second texture storage area for storing target image data to be generated, a color encoding format corresponding to the target image data being the target encoding format; and performing, through a shader called by a graphics processor (GPU), encoding format conversion on the original image data stored in the first texture storage area to generate the target image data corresponding to each texture coordinate in the second texture storage area, and storing the target image data corresponding to each texture coordinate into a corresponding storage location in the second texture storage area, comprising, for a texture coordinate in the second texture storage area:

determining, through the shader called by the GPU, a first storage location corresponding to the texture coordinate in the second texture storage area;

determining, according to a storage location correspondence between the first texture storage area and the second texture storage area, a second storage location corresponding to the texture coordinate in the first texture storage area; and computing, according to the original image data corresponding to the second storage location, the target image data corresponding to the texture coordinate in the second texture storage area, and storing the target image data into the first storage location.

2. The method according to claim 1, wherein:

the source encoding format is a red-green-blue (RGB) encoding format, and the target encoding format is a luminance-chrominance (YUV) encoding format; and the second texture storage area comprises: a first storage area for storing a luminance component of the YUV encoding format and second storage area for storing a chrominance component of the YUV encoding format, wherein the first storage area and the second storage area are continuous, each luminance component stored in the first storage area corresponds to one first chrominance component and one second chrominance component stored in the second storage area, and the target image data of the first chrominance component and the target image data of the second chrominance component are continuously stored in the second storage area.

3. The method according to claim 2, wherein:

a size of the first storage area is the same as the image size;

the second storage area comprises a first sub-area corresponding to the first chrominance component and a second sub-area corresponding to the second chrominance component, the first sub-area and the second sub-area having a same size;

the first storage area, the first sub-area, and the second sub-area have a same aspect ratio, and widths of the first sub-area and the second sub-area are determined by the target encoding format.

4. The method according to claim 1, wherein the determining, according to the storage location correspondence between the first texture storage area and the second texture storage area, the second storage location corresponding to the texture coordinate in the first texture storage area comprises:

determining a target storage area that the first storage location belongs in the second texture storage area, the target storage area being one of the first storage area and the second storage area;

converting, according to the storage location correspondence and the target storage area, the texture coordinate into a texture coordinate corresponding to the first texture storage area to obtain a converted texture coordinate; and determining a second storage location of the converted texture coordinate in the first texture storage area.

5. The method according to claim 4, wherein the computing, according to the original image data corresponding to the second storage location, the target image data corresponding to the texture coordinate comprises:

computing, according to the original image data corresponding to the second storage location, the target image data corresponding to the texture coordinate in an image data conversion manner corresponding to the target storage area.

6. The method according to claim 1, wherein the performing, through the shader called by the GPU, the encoding format conversion on the original image data stored in the first texture storage area to generate the target image data corresponding to each texture coordinate of the second texture storage area comprises:

performing, through the shader called by the GPU and in a parallel computing manner, encoding format conversion on the original image data stored in the first texture storage area to obtain the target image data corresponding to each texture coordinate.

7. The method according to claim 1, wherein the image comprises a virtual scene image in a gaming scene, the electronic device is a user terminal, and the method further comprises:

reading target image data from the second texture storage area;

converting the read target image data into image data to be displayed in the source encoding format; and displaying the virtual scene image based on the image data to be displayed.

8. The method according to claim 1, wherein the image comprises at least one virtual scene image in a cloud game, the electronic device is a cloud game server, and the method further comprises:

reading target image data from the second texture storage area corresponding to each image of the at least one virtual scene image;

performing image encoding processing on the read target image data to obtain a video stream; and transmitting the video stream to a user terminal, so that the user terminal plays the video stream.

9. An image processing apparatus, comprising: a processor and a memory, the processor and the memory being interconnected, wherein the memory is configured to store a computer program; and the processor is configured to perform:

acquiring an image size of an image and original image data of the image, a color encoding format corresponding to the original image data being a source encoding format;

creating a first texture storage area according to the image size, and storing image data of the image into the first texture storage area;

creating, according to the image size and a target encoding format, a second texture storage area for storing target image data to be generated, a color encoding format corresponding to the target image data being the target encoding format; and performing, through a shader called by a graphics processor (GPU), encoding format conversion on the original image data stored in the first texture storage area to generate the target image data corresponding to each texture coordinate in the second texture storage area, and storing the target image data corresponding to each texture coordinate into a corresponding storage location in the second texture storage area, comprising, for a texture coordinate in the second texture storage area:

determining, through the shader called by the GPU, a first storage location corresponding to the texture coordinate in the second texture storage area;

determining, according to a storage location correspondence between the first texture storage area and the second texture storage area, a second storage location corresponding to the texture coordinate in the first texture storage area; and computing, according to the original image data corresponding to the second storage location, the target image data corresponding to the texture coordinate in the second texture storage area, and storing the target image data into the first storage location.

10. The apparatus according to claim 9, wherein:

the source encoding format is a red-green-blue (RGB) encoding format, and the target encoding format is a luminance-chrominance (YUV) encoding format; and the second texture storage area comprises: a first storage area for storing a luminance component of the YUV encoding format and a second storage area for storing a chrominance component of the YUV encoding format, wherein the first storage area and the second storage area are continuous, each luminance component stored in the first storage area corresponds to one first chrominance component and one second chrominance component stored in the second storage area, and the target image data of the first chrominance component and the target image data of the second chrominance component are continuously stored in the second storage area.

11. The apparatus according to claim 10, wherein:

a size of the first storage area is the same as the image size;

the second storage area comprises a first sub-area corresponding to the first chrominance component and a second sub-area corresponding to the second chrominance component, the first sub-area and the second sub-area having a same size;

the first storage area, the first sub-area, and the second sub-area have a same aspect ratio, and widths of the first sub-area and the second sub-area are determined by the target encoding format.

12. The apparatus according to claim 9, wherein the determining, according to the storage location correspondence between the first texture storage area and the second texture storage area, the second storage location corresponding to the texture coordinate in the first texture storage area comprises:

determining a target storage area that the first storage location belongs in the second texture storage area, the target storage area being one of the first storage area and the second storage area;

converting, according to the storage location correspondence and the target storage area, the texture coordinate into a texture coordinate corresponding to the first texture storage area to obtain a converted texture coordinate; and determining a second storage location of the converted texture coordinate in the first texture storage area.

13. The apparatus according to claim 12, wherein the computing, according to the original image data corresponding to the second storage location, the target image data corresponding to the texture coordinate comprises:

computing, according to the original image data corresponding to the second storage location, the target image data corresponding to the texture coordinate in an image data conversion manner corresponding to the target storage area.

14. The apparatus according to claim 9, wherein the performing, through the shader called by the GPU, the encoding format conversion on the original image data stored in the first texture storage area to generate the target image data corresponding to each texture coordinate of the second texture storage area comprises:

performing, through the shader called by the GPU and in a parallel computing manner, encoding format conversion on the original image data stored in the first texture storage area to obtain the target image data corresponding to each texture coordinate.

15. The apparatus according to claim 9, wherein the image comprises a virtual scene image in a gaming scene, the electronic device is a user terminal, and the method further comprises:

reading target image data from the second texture storage area;

converting the read target image data into image data to be displayed in the source encoding format; and displaying the virtual scene image based on the image data to be displayed.

16. The apparatus according to claim 9, wherein the image comprises at least one virtual scene image in a cloud game, the electronic device is a cloud game server, and the method further comprises:

reading target image data from the second texture storage area corresponding to each image of the at least one virtual scene image;

performing image encoding processing on the read target image data to obtain a video stream; and transmitting the video stream to a user terminal, so that the user terminal plays the video stream.

17. A non-transitory computer-readable storage medium, wherein the computer-readable storage medium stores a computer program; and the computer program is executed by a processor to implement:

acquiring an image size of an image and original image data of the image, a color encoding format corresponding to the original image data being a source encoding format;

creating a first texture storage area according to the image size, and storing image data of the image into the first texture storage area;

creating, according to the image size and a target encoding format, a second texture storage area for storing target image data to be generated, a color encoding format corresponding to the target image data being the target encoding format; and performing, through a shader called by a graphics processor (GPU), encoding format conversion on the original image data stored in the first texture storage area to generate the target image data corresponding to each texture coordinate in the second texture storage area, and storing the target image data corresponding to each texture coordinate into a corresponding storage location in the second texture storage area, comprising, for a texture coordinate in the second texture storage area:

determining, through the shader called by the GPU, a first storage location corresponding to the texture coordinate in the second texture storage area;

determining, according to a storage location correspondence between the first texture storage area and the second texture storage area, a second storage location corresponding to the texture coordinate in the first texture storage area; and computing, according to the original image data corresponding to the second storage location, the target image data corresponding to the texture coordinate in the second texture storage area, and storing the target image data into the first storage location.

\* \* \* \* \*